March 6, 1951  M. R. RICHMOND  2,544,355
OBSTACLE-DETECTOR INDICATOR SYSTEM
Filed July 31, 1946
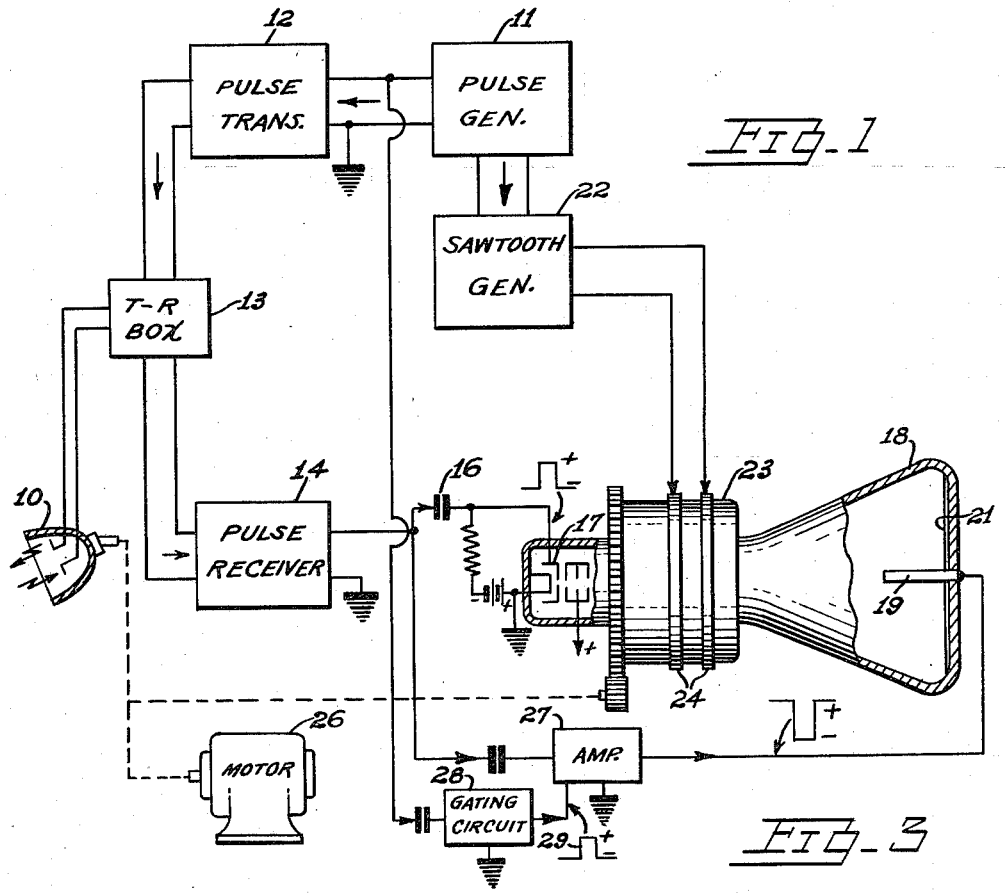
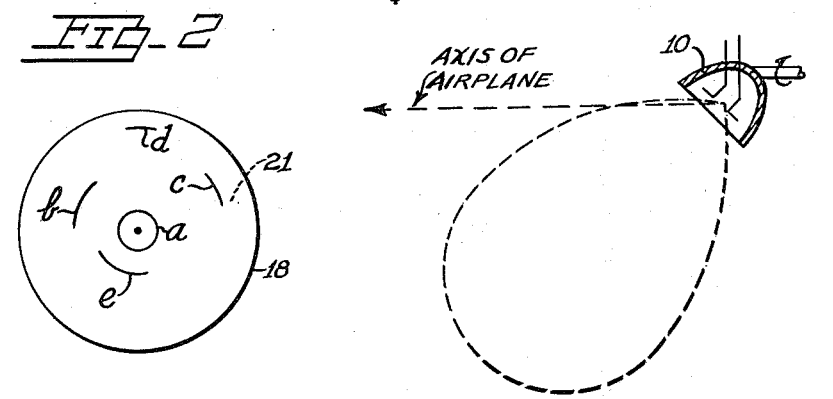
Inventor
MARTIN R. RICHMOND
Attorney Patented Mar. 6, 1951

2,544,355

UNITED STATES PATENT OFFICE 2,544,355

OBSTACLE-DETECTOR INDICATOR SYSTEM

Martin R. Richmond, Cambridge, Mass., assignor to Radio Corporation of America, a corporation of Delaware Application July 31, 1946, Serial No. 687,431

2 Claims. (Cl. 343—11)

My invention relates to obstacle detection and particularly to the use of pulse-echo radar systems on aircraft for preventing collisions.

An object of the invention is to provide an improved method of and means for indicating the presence of obstacles ahead of an aircraft.

A further object of the invention is to provide an improved radar indicator system that gives a distinctive warning indication when an obstacle is close to the craft carrying the radar equipment.

According to a preferred embodiment of the invention, a pulse-echo radar system of the P. P. I. type is utilized. The directive rotating antenna for the system is mounted on the aircraft for radiating signal forward and, as the antenna rotates, it sweeps the radiation pattern around the axis of travel of the aircraft. Any signals which are reflected from aircraft or other obstacles within the region thus scanned by the rotating antenna will appear as brightened spots or arcs on the P. P. I. indicator screen. In order to produce a distinctive warning indication when an obstacle is too close for safety, the reflected pulses are applied, not only to the beam intensity control grid of the indicator tube, but also to a radial deflecting electrode of this tube so that the strong signals reflected from nearby objects will cause the beam to be deflected radially and outwardly. As a result, the indication produced on the screen by another aircraft approaching head on will be a circle of gradually decreasing diameter until it is close enough to reflect strong signals. Then the circle on the screen suddenly begins to increase in diameter thereby warning the pilot that there is imminent danger of collision.

The invention will be better understood from the following description taken in connection with the accompanying drawing in which Figure 1 is a block and circuit diagram showing a preferred embodiment of the invention, Figure 2 is a view of the screen end of the indicator tube in Fig. 1 on which there are shown indications representing aircraft within the region being scanned by the radar system, and Figure 3 is a view showing the antenna of Fig. 1 and the position of the radiation pattern with respect to the line of flight or longitudinal axis of the aircraft.

Fig. 1 shows a pulse-echo system which may be installed in an aircraft with the directive antenna 10 mounted in the nose of the aircraft, for example. The antenna is rotatably mounted so that, as shown more clearly in Fig. 3, its radiation pattern is rotated continuously about the longitudinal axis of the aircraft to search for obstacles ahead of the aircraft.

The radio pulses are produced by means of a pulse generator 11 which pulse modulates a radio transmitter 12. The radio pulses are supplied from transmitter 12 to the antenna 10 through an antenna duplexing network 13 such as the well known transmit-receive or T-R box.

Pulses reflected from aircraft or other obstacles are picked up by the antenna 10 and supplied through the T-R box 13 to a pulse receiver 14. The video frequency pulses appearing in the receiver output are applied through a coupling capacitor 16 to the control electrode 17 of a cathode ray indicator tube 18.

The cathode ray tube 18 is of well known design and of the type having a radial deflecting electrode 19. A phosphorescent screen 21 is coated on the end of the tube 18.

The electron beam of the tube 18 is deflected radially in synchronism with the radio pulse transmission by means of a sawtooth wave that is supplied from a sawtooth wave generator 22 to a rotatable deflecting yoke 23 through slip rings 24. The yoke 23 is rotated in synchronism with the rotation of the antenna 10, a motor 26 driving both the yoke 23 and the antenna 10 as indicated by the broken lines.

The pulses reflected from an obstacle are applied to the control electrode 17 with positive polarity whereby they increase the beam intensity to produce a bright spot or arc on the screen 21. With the system thus far described, the distance of a spot from the center of the screen always represents the distance to the obstacle. The angular position of the spot represents the angular position of the obstacle.

According to the present invention, however, a special warning indication for close obstacles is provided and as a result of this provision the exact distance information for close objects is not obtained. This loss of distance information is of minor importance as compared with the production of a definite warning indication of impending collision.

The warning signal is obtained by applying the reflected pulses not only to the control electrode 17 but also to the radial deflecting electrode 19. They may be applied to electrode 19 through an amplifier 27 which reverses the pulse polarity. Thus, a received pulse appears on electrode 19 with negative polarity and deflects the electron beam outwardly. This outward deflection is negligible until the obstacle is so close that the reflected signal is strong. The result is that as the aircraft carrying the obstacle detector approaches an obstacle, the screen spot or arc representing the obstacle moves in towards the center of the screen until the effect of the radial deflection by the electrode 19 becomes dominant. Then the spot or arc starts to move away from the center of the screen thus giving the desired warning. The obstacle indication for close objects actually will be a circle as shown at $a$ in Fig. 2, and this circle will first decrease in diameter and then increase in diameter as a warning signal.

Obstacles such as aircraft at a safe distance from the warning equipped aircraft will cause the spot or arc indications such as shown in Fig. 2 at $b$, $c$, $d$ and $e$.

If desired, a gating circuit may be included in the system to prevent the electrode 19 from functioning until an obstacle is less than a predetermined distance away. The gating circuit may comprise a circuit 28 that produces a gating pulse 29 having the desired width and accuracy at a definite time following the pulse transmission. In this case, the amplifier 27 is biased to pass signal only while the gating pulse 29 is being applied. Such gating circuits are well known in the art and need not be described in detail.

It will be understood that the angle of view of the equipment depends upon the spread of the conical radiation pattern represented in Fig. 3. By using a small parabolic reflector and a dipole the radiation pattern may be made to be 80 degrees wide for example. This provides a field of view of 160 degrees which should be satisfactory for commercial aircraft installations. For use on night fighters, the angle of the radiation pattern probably should be smaller so as to obtain a more detailed indication of nearby aircraft or other obstacles.

I claim as my invention:

1. An obstacle detection system for an aircraft, said system comprising means for producing periodic pulses of radio energy, said pulses being of short duration compared with the period between successive pulses, antenna means for directively radiating said pulses ahead of said aircraft, means for causing the radiation pattern of said antenna to rotate about the longitudinal axis of said aircraft to scan an area ahead of said aircraft, means for receiving said pulses after reflection from an obstacle, a cathode ray tube having a screen and including means for producing an electron beam and directing it against said screen, means for producing a deflecting field for deflecting said beam radially in synchronism with the radiation of said pulses, means for rotating said field in synchronism with the rotation of said antenna, means for causing said received pulses to modulate said beam to produce an indication in the form of a circle on said screen that is representative of said obstacle when directly ahead of said aircraft, and means for causing said circle to increase in diameter in response to said received signal exceeding a predetermined strength or amplitude.

2. An obstacle detecting system for an aircraft, said system comprising an antenna having a directive radiation pattern and means for causing the axis of maximum radiation of said pattern to rotate about the longitudinal axis of said aircraft, means for producing periodic radio pulses and for radiating them from said antenna, means for receiving and demodulating said pulses after being reflected from an obstacle, a cathode ray indicator tube having a beam intensity control electrode, a radial deflecting electrode and a phosphorescent screen, electron beam deflecting means for producing a radial deflecting field when a deflecting wave is applied thereto, means for applying to said deflecting means a deflecting wave that recurs in synchronism with said pulse radiation, means for rotating said radial deflecting field in synchronism with the rotation of said antenna radiation pattern, means for applying the output pulses of said receiver to said beam intensity control electrode with positive polarity, and means for applying said output pulses to said radial deflecting electrode with negative polarity.

MARTIN R. RICHMOND.

REFERENCES CITED

The following references are of record in the file of this patent:

UNITED STATES PATENTS

| Number | Name | Date |
|---|---|---|
| 2,231,929 | Lyman | Feb. 18, 1941 |
| 2,401,432 | Luck | June 3, 1946 |
| 2,403,527 | Hershberger | July 9, 1946 |
| 2,403,625 | Wolff | July 9, 1946 |
| 2,422,697 | Meacham | June 24, 1947 |
| 2,426,182 | De Lange | Aug. 26, 1947 |
| 2,426,217 | Hoisington | Aug. 26, 1947 |
| 2,433,341 | Busignies | Dec. 30, 1947 |
| 2,446,850 | Root | Aug. 10, 1948 |
| 2,448,016 | Busignies | Aug. 31, 1948 |
| 2,449,976 | Busignies | Sept. 28, 1948 |
| 2,455,265 | Norgaard | Nov. 30, 1948 |

FOREIGN PATENTS

| Number | Country | Date |
|---|---|---|
| 520,778 | Great Britain | May 3, 1940 |
| 864,375 | France | Apr. 5, 1941 |